United States Patent
Chaumont

[15] 3,662,126
[45] May 9, 1972

[54] PROCESS FOR THE SIMULTANEOUS ADJUSTMENT OF ATTENUATION OF A TRANSMISSION CHAIN AND OF THE LEVEL OF A TEST SIGNAL AND APPARATUS THEREFOR

[72] Inventor: Robert Jean Chaumont, Sceaux, France
[73] Assignee: Societe Anonyme De Telecommunications, Paris, France
[22] Filed: Jan. 29, 1970
[21] Appl. No.: 6,877

[30] Foreign Application Priority Data
Apr. 24, 1969 France...................................6913115

[52] U.S. Cl............................................179/175.3, 179/175
[51] Int. Cl........................................H04m 1/24, H04b 3/46
[58] Field of Search.........................179/175, 175.3, 175.1 R

[56] References Cited
UNITED STATES PATENTS
2,348,572  5/1944  Richardson..........................179/175

Primary Examiner—Kathleen H. Claffy
Assistant Examiner—Douglas W. Olms
Attorney—Seidel and Gonda

[57] ABSTRACT

This invention relates to the maintenance of a transmission chain which, from a variable input level, delivers a constant output level. To do this, the said transmission chain comprises, in addition to its functional components, an artificial line with adjustable attenuation, which the operator can use when faced with an input level determined by elements situated up-side the said chain, so as to obtain the constant output level necessary for the working of the elements situated down-side the said chain.

In accordance with this process the value of the artificial attenuation line varies inversely to the value of the artificial attenuation line integrated in the said transmission chain.

7 Claims, 2 Drawing Figures

PROCESS FOR THE SIMULTANEOUS ADJUSTMENT OF ATTENUATION OF A TRANSMISSION CHAIN AND OF THE LEVEL OF A TEST SIGNAL AND APPARATUS THEREFOR

This invention relates to the maintenance of a transmission chain which, from a variable input level, delivers a constant output level. To do this, the said transmission chain comprises, in addition to its functional components, an artificial line with adjustable attenuation, which the operator can use when faced with an input level determined by elements situated up-side the said chain, so as to obtain the constant output level necessary for the working of the elements situated down-side the said chain. One of the maintenance operations for such a transmission chain consists of injecting into the input, by means of a calibrating oscillator, a test signal of a known level $L_T$, and of verifying that the desired level $L_o$ is obtained at the output of the said chain. The presence of the artificial attenuation line within the transmission chain entails the obligation to regulate the level of the calibrating oscillator each time monitoring is effected. This procedure necessitates a knowledge of the value of the artificial attenuation line used, which is not always easy if the line is adjusted, for example, inside a casing.

One solution to this problem would consist of bringing the level of the calibrating oscillator automatically under the control of the value of the artificial line; but this solution, in addition to complicating the transmission chain and the measuring installations, is expensive to manufacture.

The process in accordance with the invention brings a new, simple and cheap solution to this problem.

The process in accordance with the invention is characterized by the fact that the calibrating oscillator is linked to the transmission chain input through an artificial attenuation line whose value varies inversely to the value of the artificial attenuation line integrated in the said transmission chain, in such a way that the sum of the values of these two artificial attenuation lines is constant and equal to the difference between the output levels of the calibrating oscillator and the transmission chain, less the attenuation due to the functional components of the transmission chain.

The device manufactured by applying the said process also forms part of the present patent. This device is characterized by the fact that a series of artificial attenuation lines are grouped within the same plug-in cabinet in such a way that when an artificial attenuation line value is put into service in the transmission chain, the artificial attenuation line necessary to connect the calibrating oscillator with the input of the said chain is automatically in an operational position.

Other characteristics and advantages of the process and device in accordance with the invention will appear in the course of the following description, the understanding of which will be facilitated by reference to the attached drawings.

The following description constitutes a non-limiting example in which the transmission chain used is the terminating part of a functional component of a telephone system.

Figure 1:
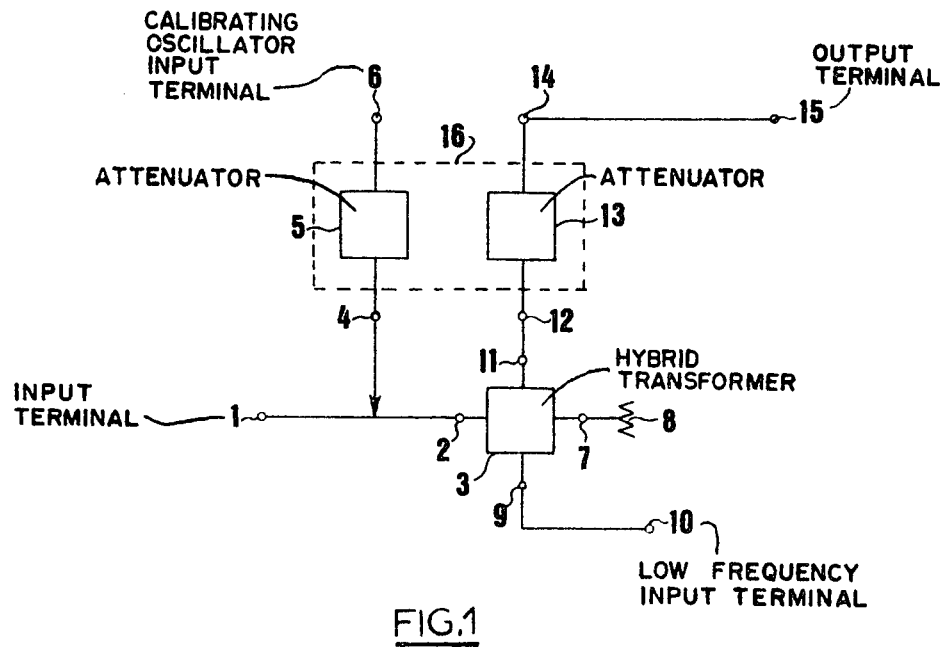
FIG. 1 represents the plan of the terminating part of a functional operating component.

The two-wire line which links the subscriber to the terminating part of a functional operating component is connected to the terminal 1, shown in FIG. 1. This terminal is linked, on the one hand, to the terminal 2 of a hybrid transformer 3 and, on the other hand, to the terminal 4 of an attenuation line 5 whose other terminal 6 is intended to be linked to the calibrating oscillator.

The hybrid transformer is equilibrated, its output terminal 7 being linked to a balancing network 8. This same hybrid transformer receives via its input terminal 9, linked to the terminal 10 of the terminating part of the terminating unit, the low-frequency reception signals. The output terminal 11 of this hybrid transformer 3 is linked to a terminal 12 of an artificial attenuation line 13, whose other terminal 14 is linked to the output terminal 15 of the terminating part of the functional operating component represented in FIG. 1. In accordance with the present invention the artificial attenuation lines 5 and 13 are grouped in the same cabinet 16 which can, if need be, comprise a whole range of artificial attenuation lines positioned in such a way that when the attenuation line 13 necessary for the proper functioning of the terminating part of the functional operating component is in place, the artificial attenuation line 5, of the value necessary for using the calibrating oscillator, is automatically in an operational position.

Figure 2:
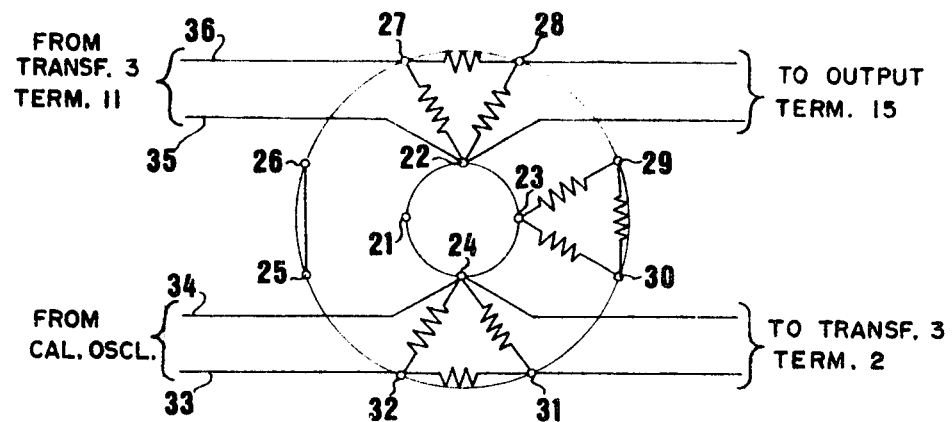
FIG. 2 represents the plan of a preferred production method of the device in accordance with the invention.

FIG. 2 represents a production method for a cabinet 16 containing four artificial attenuation lines. As an example, the values chosen are 0, 4, 8 and 12 decibels. In this realization, the artificial attenuation lines are obtained in accordance with the technology of thick layers on a ceramic support comprising 12 pins numbered, in FIG. 2, from 21 to 32. The terminals 21, 25 and 26 correspond to the artificial attenuation line 0 db, terminals 22, 27 and 28 to the 4 db line, terminals 23, 29 and 30 to the 12 db line, and terminals 24, 31 and 32 to the 8 db line. The wires 33 and 34 links the calibrating oscillator to the subscriber's two-wire line and wires 35 and 36 link the hybrid transformer to the low-frequency transmission terminal. It will be seen from FIG. 2 that, whatever the artificial attenuation line put into service between wires 35 and 36, the artificial attenuation line necessary between wires 33 and 34 is automatically in position. In the particular case chosen, the sum of these two artificial attenuation lines is 12 db. This is equal to the value of the difference between the output levels of the calibrating oscillator and the low-frequency transmission, less the attenuation due to the hybrid transformer.

In the realization shown in FIG. 2, the artificial attenuation lines are four in number. It is obvious that with a support comprising a sufficient number of pins the number of artificial lines can be much greater.

This support plugs into a multi-pin socket base and can, by rotation, take up as many positions as there are artificial attenuation lines, thus putting into service the appropriate artificial lines.

The process and device in accordance with the invention are useful, amongst other uses, in low-frequency functional telephone operating components comprising transmission and reception level adjustments.

What is claimed is:

1. A method for operating and testing a transmission chain that includes functional equipment having a given attenuation, said chain having an input to which a source is connected and an output providing a desired signal level when the chain has a particular overall attenuation, said method comprising:
   a. providing a plurality of pairs of attenuators of different values such that the sum of the attenuation of each pair is a constant;
   b. selecting a pair of attenuators in which one attenuator of the pair has a value which, when added to the value of the attenuation of said functional equipment, will cause the transmission chain to have said particular overall attenuation, and connecting said one attenuator in series with said functional equipment whereby the chain can be operated; and
   c. testing said chain by applying a test signal of a given amplitude to the input of said chain through the other attenuator of said selected pair of attenuators.

2. Attenuator means for use with a transmission chain including functional equipment having a given attenuation and having an input to which a source is connected and an output providing a desired signal level when the transmission chain has a particular overall attenuation, said attenuator means comprising:
   a. a base mounting a plurality of pairs of attenuators of different values such that the sum of the attenuation of each pair is a constant;
   b. one attenuator of a selected pair having a value, which when added to the value of the attenuation of said functional equipment, will cause the transmission chain to have said particular overall attenuation;

c. means adapted to connect said one attenuator in series with said functional equipment; and d. means adapted to connect the other attenuator of said selected pair to the input of said transmission chain so that a test signal applied to said other attenuator will have a fixed attenuation regardless of which pair of attenuators is selected.

3. Attenuation means according to claim 2 wherein said pairs of attenuators are mounted on said base opposite each other to facilitate identification of the attenuators of each pair.

4. Attenuation means according to claim 3 wherein said base is round, and pairs of attenuators are mounted diametrically opposite.

5. Attenuator means according to claim 4 wherein said base is rotatable.

6. A process for the adjustment of attenuation of a transmission chain, particularly in a telecommunication system, including the steps of integrating a first artificial attenuation line into the transmission chain, linking a calibrating oscillator to the transmission chain by means of a second artificial attenuation line, choosing the value of the second artificial attenuation line in inverse relationship to the value of the first artificial attenuation line such that the sum of the values of the first artificial attenuation line and the second artificial attenuation line is constant.

7. Apparatus for adjustment of the attenuation of a transmission line, particularly for a telecommunications installation, including a first artificial attenuation line in the transmission chain, a calibrating oscillator linked to the transmission chain by means of a second artificial attenuation line, the attenuation value of said two artificial attenuation lines being set to vary inversely such that the sum of their values is always constant, said attenuation lines being comprised of a plug-in support grouping of artificial attenuation lines arranged so that when one artificial line is put into service in a transmission chain the artificial attenuation line for linking the calibrated oscillator to the transmission chain is automatically in an operational mode.

* * * * *